United States Patent [19]
Yasumura

[11] Patent Number: 5,973,937
[45] Date of Patent: *Oct. 26, 1999

[54] SWITCHING POWER SUPPLY CIRCUIT OF CURRENT-RESONANCE TYPE WITHOUT A CHOKE COIL

[75] Inventor: Masayuki Yasumura, Kanagawa, Japan

[73] Assignee: Sony Corporation, Tokyo, Japan

[ * ] Notice: This patent is subject to a terminal disclaimer.

[21] Appl. No.: 08/538,571

[22] Filed: Oct. 3, 1995

[30] Foreign Application Priority Data

Oct. 11, 1994 [JP] Japan ................................. P06-271779
Dec. 7, 1994 [JP] Japan ................................. P06-330383

[51] Int. Cl.⁶ .................................................. H02M 3/338
[52] U.S. Cl. ................................................ 363/19; 363/97
[58] Field of Search ................................. 363/17–25, 37, 363/97, 133

[56] References Cited

U.S. PATENT DOCUMENTS

| | | | |
|---|---|---|---|
| 4,369,491 | 1/1983 | Rizzi | 363/56 |
| 4,424,556 | 1/1984 | Maeda et al. | 363/17 |
| 5,216,585 | 6/1993 | Yasumura | 363/19 |
| 5,640,310 | 6/1997 | Yasumura | 363/19 |
| 5,675,491 | 10/1997 | Kijima | 363/133 |
| 5,835,368 | 11/1998 | Yasumura | 363/89 |

*Primary Examiner*—Adolf Denske Berhane
*Attorney, Agent, or Firm*—Jay H. Maioli

[57] ABSTRACT

A switching power supply circuit of current-resonance type with the capability of power factor improvement includes a filter capacitor ($C_N$) connected between the positive and negative output terminals of the rectifier, a filter choke coil ($L_N$) and fast-recovery diode ($D_2$) connected in series to cut in on the rectifier output line, and a resonant capacitor ($C_2$) which forms a resonant circuit in unison with the filter choke coil. The output of a series resonant circuit ($C_1, N_1$) on the primary side is superimposed on the rectifier output so that the power factor is improved, thereby eliminating the need of a choke coil (CH). The circuit accomplishes the more compact, light-weight and low-cost design, and improves the power conversion efficiency.

21 Claims, 12 Drawing Sheets

FIG. 2a  V_AC 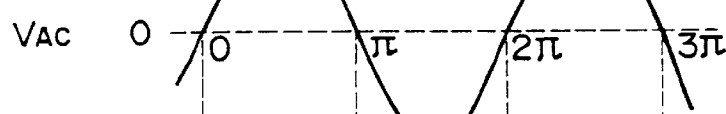
FIG. 2b  I_1 
FIG. 2c  I_2 
FIG. 2d  I_3 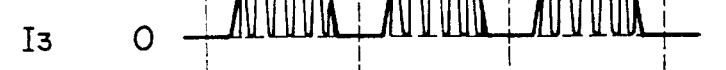
FIG. 2e  V_2 
FIG. 2f  V_3 
FIG. 2g  I_4 
FIG. 2h  I_0 
FIG. 2i  I_5 
FIG. 2j  I_AC 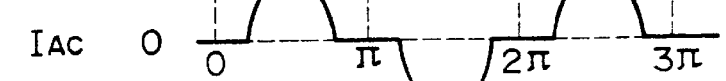

FIG. 8a $V_{AC}$ 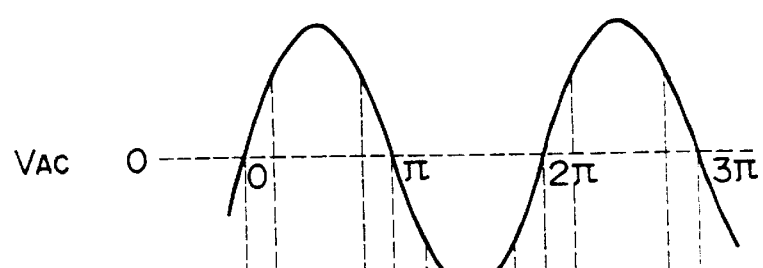
FIG. 8b $I_1$ 
FIG. 8c $I_2$ 
FIG. 8d $I_3$ 
FIG. 8e $I_4$ 
FIG. 8f $\begin{Bmatrix}I_5\\I_6\end{Bmatrix}$ 
FIG. 8g $V_1$ 
FIG. 8h $I_7$ 
FIG. 8i $I_8$ 
FIG. 8j $I_{AC}$ 

SWITCHING POWER SUPPLY CIRCUIT OF CURRENT-RESONANCE TYPE WITHOUT A CHOKE COIL

BACKGROUND OF THE INVENTION

1. Field of the Invention

The present invention relates to a switching power supply circuit of current-resonance type with the capability of improving the power factor.

2. Description of Related Art

Due to recently-developed switching elements that withstand relatively high voltages and large currents and operate at high frequencies, power supply units for producing intended d.c. voltages by rectifying the a.c. line voltage are mostly designed to be switching power supply units. Switching power supply units operating at higher switching frequencies enable the size reduction of the transformer and other circuit components, and are used as large-power d.c. to d.c. converters in power supply units of various kinds of electronic equipment.

Generally, when power of the a.c. line is rectified, the current flowing in the smoothing circuit has its waveform distorted, resulting unfavorably in the degradation of the power factor which indicates the efficiency of use of power. It is therefore required to suppress the harmonic waves derived from the distorted current waveform.

For dealing with this situation, the applicant of the present invention has previously proposed a switching power supply circuit with the capability of power factor improvement as shown in FIG. 13. This power supply circuit is a self-excited current-resonance power converter of half-bridge configuration.

In the figure, supplied a.c. line power AC is subjected to full-wave rectification by a bridge rectifier $D_1$ made up of four diodes. The bridge rectifier $D_1$ has its positive output terminal connected to the positive electrode of a smoothing capacitor Ci by way of a serial connection of a filter choke coil $L_N$, a fast-recovery diode $D_2$ and a choke coil CH, as shown. A filter capacitor $C_N$ is connected between the node of the filter choke coil $L_N$ and diode $D_2$ and the positive electrode of the smoothing capacitor Ci, with the filter capacitor $C_N$ and filter choke coil $L_N$ in unison constituting an LC low-pass filter used in the normal operation.

The LC low-pass filter is intended to prevent the high-frequency switching noise from entering to the a.c. line. The fast-recovery diode $D_2$ is used to cope with the current of the switching frequency flowing on the full-wave rectifier output line as will be explained later.

The capacitor $C_2$ is used as a parallel resonant capacitor, which is connected in parallel to the choke coil CH as shown in the figure to form a parallel resonant circuit with it. The parallel resonant circuit has its resonant frequency set virtually equal to the resonant frequency of the switching power supply unit. The operation of the parallel resonant circuit will be explained later.

A half-bridge switching circuit is configured by a pair of switching elements $Q_1$ and $Q_2$, with their collectors and emitters being connected in cascade between the positive electrode of the smoothing capacitor Ci and the ground as shown in the figure. The switching elements $Q_1$ and $Q_2$ have their collectors and bases connected by respective starting resistors $R_S$ and have their bases and emitters connected by respective damper diodes $D_D$.

The $Q_1$ and $Q_2$ have base resistors $R_B$ for adjusting their base drive currents connected in series to respective resonant capacitors $C_B$, which constitute series resonant circuits for self-excited oscillation in unison with respective drive windings $N_B$ of a driving transformer PRT. The driving transformer PRT, which controls the switching frequency of the switching elements $Q_1$ and $Q_2$, has drive windings $N_B$ and a resonant current detecting winding $N_D$, and it further has a control winding $N_C$ which is wound orthogonally to the windings $N_B$ and $N_D$, thereby forming an orthogonal saturable reactor.

One drive winding $N_B$ has one end connected to the resistor $R_B$ and another end connected to the emitter of the switching element $Q_1$. Another drive winding $N_B$ has one end grounded and another end connected to the resistor $R_B$ of the switching element $Q_2$, and it has the opposite polarity of voltage relative to the former winding $N_B$. The current detecting winding $N_D$ has its one end connected to the node of the emitter of $Q_1$ and the collector of $Q_2$ and another end connected through a series resonant capacitor $C_1$ to one end of the primary winding $N_1$ of an insulating transformer PIT.

The insulating transformer PIT, which transfers the switching output of the switching elements $Q_1$ and $Q_2$ to the secondary side, has a primary winding $N_1$ which is connected at one end to the current detecting winding $N_D$ through a series resonant capacitor $C_1$ and at another end to the node of the fast-recovery diode $D_2$ and choke coil CH. The series resonant capacitor $C_1$ and the inductance component of the insulating transformer PIT including the primary winding $N_1$ form a resonant circuit permitting the switching power supply circuit to be of current-resonance type.

The insulating transformer PIT has a secondary winding $N_2$, on which a voltage is induced in unison with the primary winding $N_1$, and the induced voltage is rectified by a bridge rectifier $D_3$ and smoothing capacitor $C_3$ to produce a d.c. output voltage $E_o$.

A control circuit 1 evaluates the difference of the d.c. output voltage $E_o$ from the reference voltage and amplifies the differential signal to produce a d.c. control output $I_C$ to be fed to the control winding $N_C$ of the driving transformer PRT.

In operation, when the a.c. line power is supplied to the switching power supply unit arranged as described above, the base currents are fed to the bases of the switching elements $Q_1$ and $Q_2$ by way of the starting resistors $R_S$. In this case, one of $Q_1$ and $Q_2$, e.g., $Q_1$, that turns on first causes another switching element, i.e., $Q_2$, to be cut off. The resonant current flows from the switching element $Q_1$ to the current detecting winding $N_D$, to the capacitor $C_1$, and to the primary winding $N_1$. When the resonant current decreases to zero, the switching element $Q_2$ turns on and the switching element $Q_1$ turns off. The resonant current flows through the switching element $Q_2$ in the direction opposite to that of the switching element $Q_1$. In this manner, the switching elements $Q_1$ and $Q_2$ turn on alternately, and the self-excited switching operation starts.

The switching elements $Q_1$ and $Q_2$ turn on and off cyclically for the operational power on the smoothing capacitor Ci to feed a drive current with a waveform close to the resonant current waveform to the primary winding $N_1$ of the insulating transformer PIT, and a.c. power is obtained on the secondary winding $N_2$.

If the d.c. output voltage $E_o$ falls, the control circuit 1 controls the current of the control winding $N_C$ to lower the switching frequency (close to the resonant frequency) so as to increase the drive current of the primary winding $N_1$, thereby stabilizing the output voltage $E_o$ (this is a method for switching frequency control).

In regard to the improvement of the power factor based on this circuit arrangement, the switching output corresponding to the resonant current flowing on the primary winding $N_1$ of the insulating transformer PIT is superimposed directly on the rectified current of the a.c. line power flowing through the self-inductance Li of the winding Ni of the choke coil CH. Accordingly, the smoothing capacitor Ci is charged to the full-wave rectified voltage with the switching output voltage superimposed on it, and the terminal voltage of the capacitor Ci is lowered periodically by the superimposed switching output voltage. Consequently, a charging current flows during the period when the terminal voltage of the capacitor Ci is lower than the rectified voltage of the bridge rectifier, and the average a.c. input current is made close to the a.c. voltage waveform and the power factor is improved. The series resonant capacitor $C_1$ is discharged back to the smoothing capacitor Ci by way of the primary winding $N_1$ of the insulating transformer PIT during the period when the a.c. input current does not flow in.

The power supply circuit based on this scheme of power factor improvement has a smaller drive current of the insulating transformer PIT in small load condition, and accordingly the switching current flowing on the full-wave rectifier output line in response to the drive circuit is also small. Based on the charging current which is proportional to the load, it becomes possible to prevent the terminal voltage of the smoothing capacitor Ci from rising abnormally in small load condition and thereby improve the regulation. Even for a ±20% variation of the a.c. input voltage, for example, the variation of the rectified-and-smoothed voltage Vi is suppressed sufficiently, and the need to use switching elements and a smoothing capacitor with higher withstand voltages is eliminated.

The resonant capacitor $C_2$ connected to the self-inductance Li of the choke coil CH is intended to suppress the switching voltage which is fed back to the rectify-smoothing line when the load of the switching power supply unit decreases, and it becomes possible to prevent the terminal voltage Ei of the smoothing capacitor Ci from rising in small load condition.

Namely, the power supply circuit of FIG. 13 operates to raise the switching frequency when the load power decreases, and in this case the switching voltage returning to the charging circuit is suppressed by the capacitor $C_2$ and the rise of the terminal voltage is prevented. On the other hand, when the load power increases, the switching frequency falls close to the resonant frequency of the resonant circuit formed of the self-inductance Li and capacitor $C_2$, thereby raising the feedback switching voltage. Accordingly, this power supply circuit has little variation of the terminal voltage of the smoothing capacitor caused by the variation of load, making the stabilization of d.c. output voltage Eo easy.

FIG. 14A and FIG. 14B show the filter choke coil $L_N$ and choke coil CH used in the power supply circuit of FIG. 13. The filter choke coil $L_N$ is arranged by winding a copper wire coated with polyurethane directly on a drum-shaped ferrite core D without using a bobbin as shown in FIG. 14A. The choke coil CH is made up of a pair of E-shaped ferrite cores facing each other, with a gap G being formed between the confronting central arms so that the magnetic flux does not leak to the outside of the choke coil as shown in FIG. 14B. A winding Ni which is a polyurethane-coated copper wire of 60-$\mu$m diameter is wound on a bobbin (not shown) such that the inductance Li is not saturated in maximum load condition. Specifically, for the output power rating of 120 W of the d.c. output voltage $E_o$, a choke coil CH of Li=15 $\mu$H is arranged by winding a Litz wire at 60 $\mu$/80 bunch on the EE-16 core, or for the output power rating of 230 W, a choke coil CH of Li=100 $\mu$H is arranged by winding a Litz wire at 60 $\mu$/130 bunch on the EE-25 core.

SUMMARY OF THE INVENTION

It is an object of the present invention to provide a switching power supply circuit of current-resonance type with the intention of reducing the number of component parts and using compact and inexpensive component parts so that the power supply unit is compact, light-weight and low-cost, and also improving the power conversion efficiency.

In order to achieve the above objective, the present invention resides in a switching power supply circuit of current-resonance type with the capability of power factor improvement, the circuit arrangement comprising a rectifier for rectifying the a.c. line power, a smoothing circuit for smoothing the output of the rectifier, a switching converter which operates by conducting and blocking the output voltage of the smoothing circuit, a series resonant circuit which is formed of the primary winding of an insulating transformer and a series resonant capacitor and configured so that the switching output of the switching converter is superimposed on the power on the line between the rectifier and smoothing circuit, a filter capacitor connected between the positive and negative output terminals of the rectifier, a filter choke coil and fast-recovery diode connected in series to cut in on the line between the positive output terminal of the rectifier and the positive electrode of the smoothing capacitor of the smoothing circuit, and a resonant capacitor which is connected in parallel to the fast-recovery diode to form a resonant circuit in unison with the filter choke coil.

The resonant circuit has its resonant frequency set lower than the minimum switching frequency.

The series resonant capacitor is divided and connected in parallel to the fast-recovery diode.

The invention also resides in a switching power supply circuit of current-resonance type having a voltage-doubling rectifier, the circuit arrangement including, on the input side of the voltage-doubling rectifier where the a.c. line power is supplied, a filter capacitor for blocking the switching noise and a filter choke coil connected in series to cut in on the rectification path, with the switching current produced by the switching converter being fed to the rectifying fast-recovery diodes which constitute the voltage-doubling rectifier by way of the primary winding of the insulating transformer.

Parallel resonance capacitors are connected in parallel to the rectifying diodes of the voltage-doubling rectifier such that the resonant circuits formed of these parallel resonance capacitors and filter choke coil have a resonant frequency lower than the minimum switching frequency.

In the case of self-excitation type, constant voltage control is implemented by varying the switching frequency of the switching converter based on the d.c. output voltage delivered from the secondary side of the insulating transformer, or alternatively by varying the magnetic flux of the insulating transformer based on the d.c. output voltage delivered from the secondary side of the insulating transformer. In the case of separate-excitation type, constant voltage control is implemented by varying the switching drive signal based on the d.c. output voltage delivered from the secondary side of the insulating transformer.

In the current-resonance switching power supply circuits of various types arranged as described above, inclusive of the one based on the voltage-doubling rectifier, comprising a filter capacitor connected between the positive and negative rectifier output terminals, a filter choke coil and fast-recovery diode connected to cut in on the rectifier output line, and a resonant capacitor which forms a resonant circuit in unison with the filter choke coil, wherein the output of the series resonant circuit on the primary side is superimposed on the rectifier output so that the power factor is improved, and consequently it becomes possible to eliminate the need of a choke coil.

BRIEF DESCRIPTION OF THE DRAWINGS

FIG. 2A through FIG. 2J are waveform diagrams showing the operation of the switching power supply circuit of this embodiment;

FIG. 8A through FIG. 8J are waveform diagrams showing the operation of the switching power supply circuit shown in FIG. 7;

DESCRIPTION OF THE PREFERRED EMBODIMENTS

Figure 1:
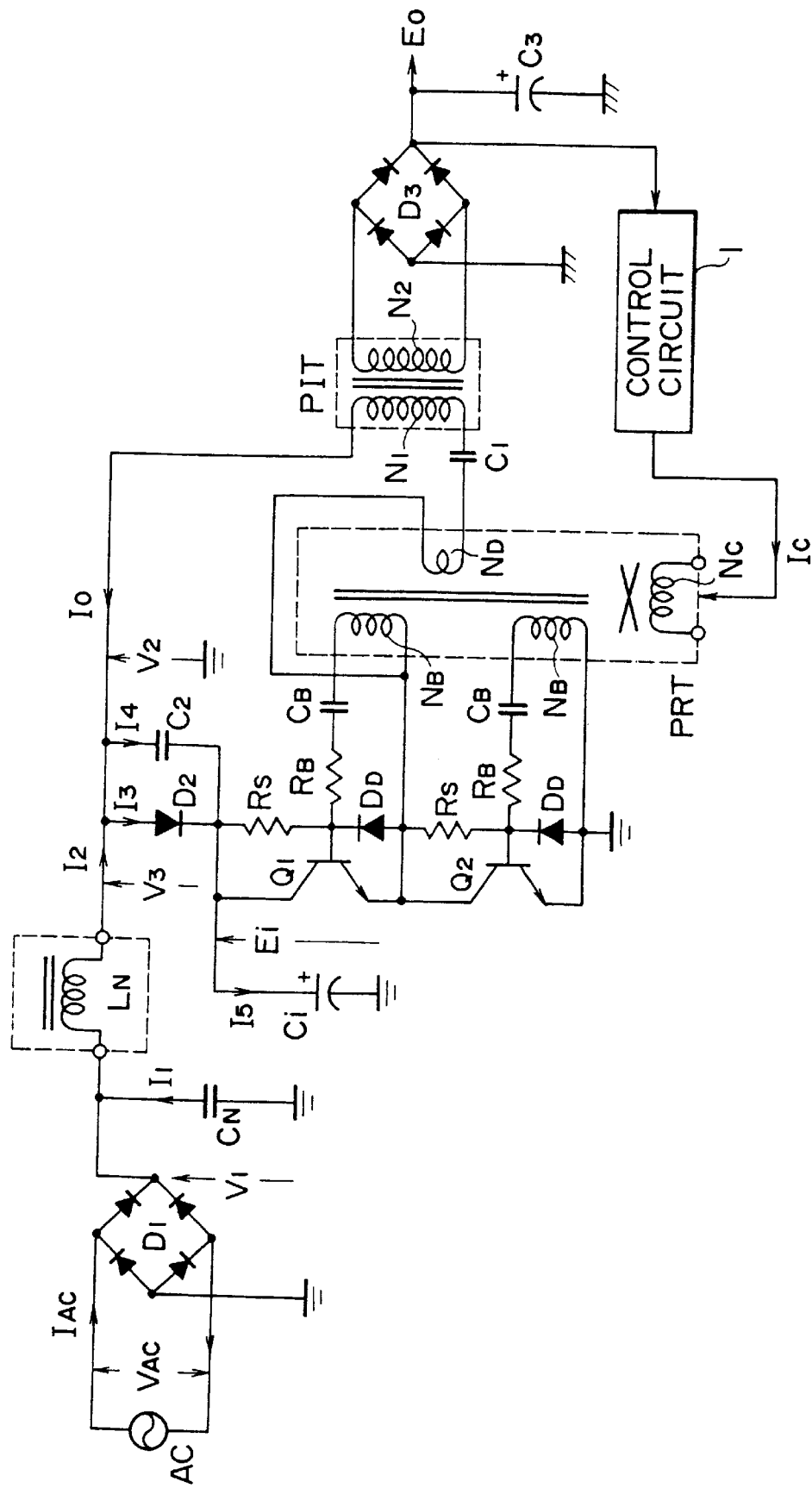
FIG. 1 is a schematic diagram of the current-resonance switching power supply circuit based on an embodiment of this invention.
Figure 13:
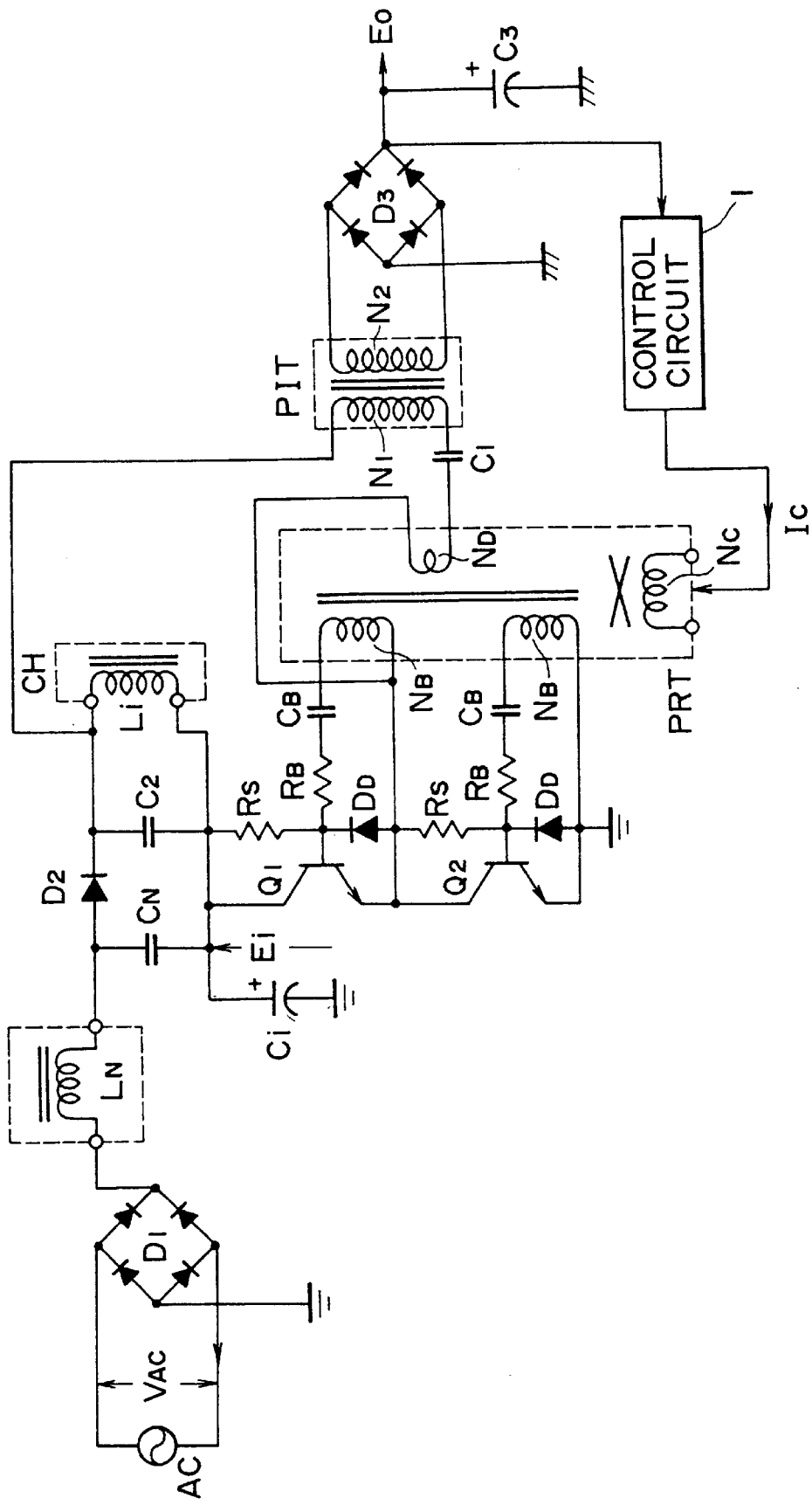
FIG. 13 is a schematic diagram of the the current-resonance switching power supply circuit of the prior art.

FIG. 1 shows the current-resonance switching power supply circuit based on an embodiment of this invention. In the figure, portions identical to those of FIG. 13 are referred to by the same symbols, and an explanation thereof will be omitted.

In the circuit, a filter capacitor $C_N$ is connected between the positive output terminal and the negative output terminal (i.e., ground) of the bridge rectifier $D_1$. The filter choke coil $L_N$ has its one end connected to the node of the filter capacitor $C_N$ and the positive output terminal of the bridge rectifier $D_1$, and another end connected to the anode of the fast-recovery diode $D_2$. The resonant capacitor $C_2$ is connected in parallel to the fast-recovery diode $D_2$.

Figure 14A:
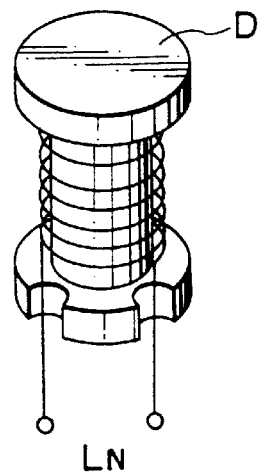
FIG. 14A is a perspective view showing the structure of the filter choke coil.
Figure 14B:
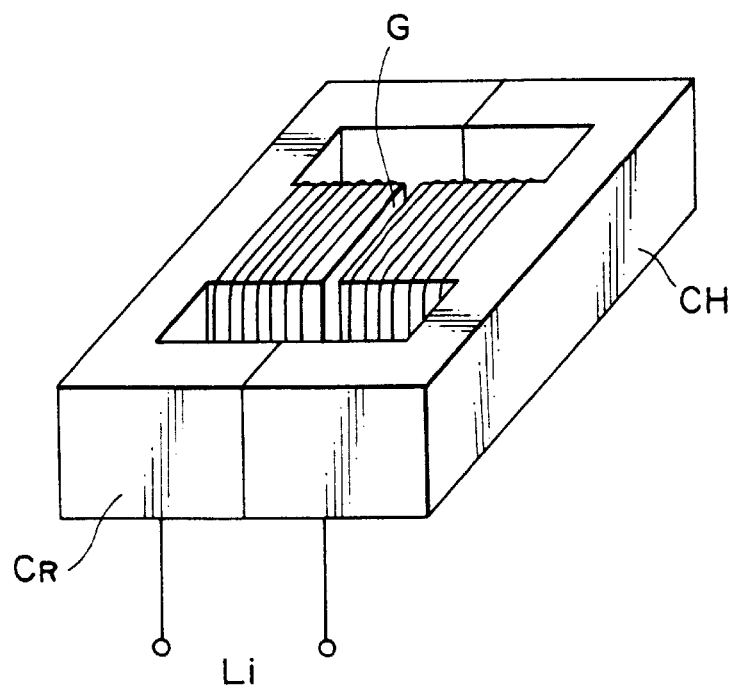
FIG. 14B is a perspective view showing the structure of the choke coil.

The filter choke coil $L_N$ used in this embodiment is a drum-shaped inductor with an open magnetic path as shown in FIG. 14A.

The resonant capacitor $C_2$ has its capacitance selected to be greater than that of the series resonant capacitor $C_1$, and it is connected to the inductance of the filter choke coil $L_N$ to form a resonant circuit. The resonant circuit has its resonant frequency set lower than the minimum switching frequency of the switching elements $Q_1$ and $Q_2$.

Another series resonant circuit formed of the primary winding $N_1$ of the insulating transformer and the capacitor $C_1$ is connected to the node of the filter choke coil $L_N$, the anode of the fast-recovery diode $D_2$ and the resonant capacitor $C_2$ so that the series resonant current $I_0$ on the primary side of the current-resonance converter circuit flows through the resonant capacitor $C_2$.

Based on this circuit configuration, the switching voltage from the series resonant circuit is superimposed on the voltage of the filter choke coil $L_N$, and accordingly the filter choke coil $L_N$ serves as a constituent of the LC low-pass filter and also for the choke coil CH used in the circuit arrangement shown in FIG. 13. Consequently, by choosing the filter choke coil $L_N$ properly, it is possible to improve the power factor as in the case shown in FIG. 13 even though the choke coil CH is absent.

As a specific example, using an a.c. input voltage $V_{AC}$ of 100 V (±15%) and load power Po of 0–120 W, when a series resonant capacitor $C_1$ of 0.018 $\mu$F, a resonant capacitor $C_2$ of 0.047 $\mu$F and filter choke coil $L_N$ of 220 $\mu$H are used, the power factor can be improved to 0.81. As another example for the same a.c. input voltage and load power, when a resonant capacitor $C_2$ of 0.1 $\mu$F and filter choke coil $L_N$ of 100 $\mu$H are used, the power factor can be improved to 0.75.

FIG. 2A through FIG. 2J are waveform diagrams showing the operation of various portions of the switching power supply circuit shown in FIG. 1.

For the a.c. supply voltage $V_{AC}$ shown in FIG. 2A, a high-frequency sinusoidal current $I_1$ having a switching period shown in FIG. as 2B flows through the filter capacitor $C_N$. This current is small, and it can be treated by an inexpensive capacitor. The current I2 flowing through the filter choke coil $L_N$ has a waveform of the rectified a.c. input current $I_{AC}$ (shown in FIG. 2J) superimposed by a small amount of a high-frequency current, as shown in FIG. 2C. Therefore, the filter choke coil $L_N$ having the above-mentioned structure has little temperature rise by heat generation.

The current $I_3$ flowing through the fast-recovery diode $D_2$ has its waveform recessed at the peak section as shown in FIG. 2D. Therefore, the fast-recovery diode $D_2$ has its forward voltage drop reduced, and heat generation decreases accordingly. FIG. 2F shows the voltage V3 across the fast-recovery diode $D_2$.

The series resonant current $I_0$ of the series resonant circuit has a high-frequency waveform shown in FIG. 2H, and it flows on the line toward the resonant capacitor $C_2$. FIG. 2G shows the current $I_4$ flowing through the resonant capacitor $C_2$, and the voltage $V_2$ across the resonant capacitor $C_2$ is the rectified voltage $V_1$ superimposed by a high-frequency voltage, as shown in FIG. 2E. FIG. 2I shows the waveform of the charging current $I_5$ with the switching period flowing through the smoothing capacitor Ci. FIG. 2J shows an average waveform of the a.c. input current $I_{AC}$ from the a.c. power supply AC, indicating an expanded conduction angle to the extent of improving the power factor depending on the selected parameters of the circuit components mentioned previously.

Figure 3:
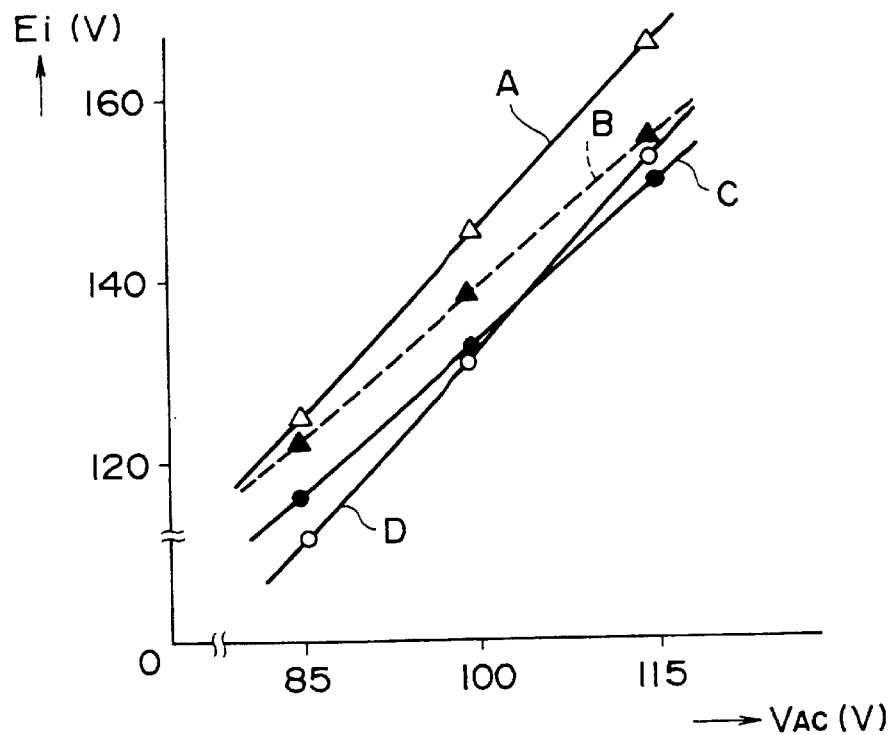
FIG. 3 is a graph showing the rectified-and-smoothed voltage vs. a.c. input voltage characteristics of this embodiment.

FIG. 3 shows the rectified-and-smoothed voltage Ei vs. a.c. input voltage $V_{AC}$ characteristics of the switching power supply circuit shown in FIG. 1 contrasted with the prior art circuit shown in FIG. 13 in various load power Po conditions. On the graph, line A is the characteristic of the circuit of FIG. 13 without resonant capacitor $C_2$ at load power Po of 0 W (no load). Line B is the characteristic of the circuit of FIG. 13 with resonant capacitor $C_2$ and also of the circuit of this embodiment shown in FIG. 1 at load power Po of 0 W (no load). The comparison of the lines A and B reveals that the circuits of FIG. 1 and FIG. 13 have the same characteristic in no-load condition, and that the circuit of FIG. 1 suppresses the output voltage variation more than the circuit of FIG. 13 without resonant capacitor $C_2$ for the a.c. input voltage $V_{AC}$ range 85–115 V.

Line C and line D are the characteristics of the switching power supply circuits of FIG. 1 and FIG. 13, respectively, at load power Po of 120 W (heavy load). These lines reveal that the switching power supply circuit of FIG. 1 exhibits a smaller incline of i.e., more improvement in terms of the regulation of output voltage, than does the circuit of FIG. 13 for the a.c. input voltage $V_{AC}$ range of below 100 V.

Figure 4:
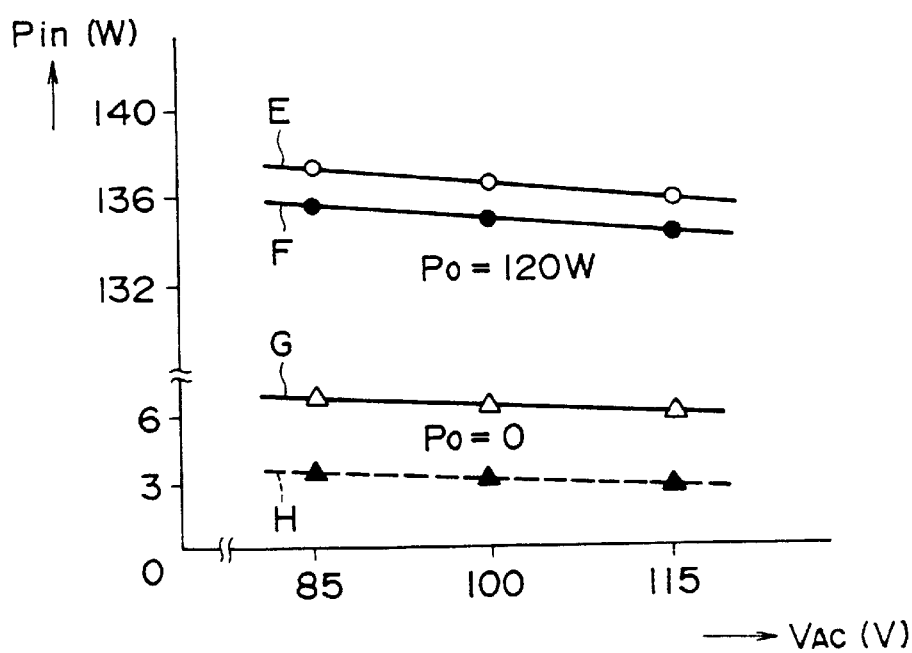
FIG. 4 is a graph showing the a.c. input power vs. a.c. input voltage characteristics of this embodiment.

FIG. 4 shows the a.c. input power Pin vs. a.c. input voltage $V_{AC}$ characteristics in various load power Po conditions. Lines E and F are characteristics of the switching power supply circuits of FIG. 13 and FIG. 1, respectively, at load power Po of 0 W (no load). Lines G and H are characteristics of the switching power supply circuits of FIG. 13 and FIG. 1, respectively, at load power Po of 120 W. The graph reveals that the switching power supply circuit of this embodiment shown in FIG. 1 consumes less a.c. input power Pin than the circuit of FIG. 13 in both no-load and heavy load conditions.

The switching power supply circuit of this embodiment exhibits the an 89% power conversion efficiency in heavy load condition, which is better by 1% than the 88% of the circuit of FIG. 13 for the a.c. input voltage $V_{AC}$ range of 85–115 V. The switching power supply circuit of this embodiment consumes as little as about 3.0 W in the no-load standby state, which is less than half of the 6.2 W of the circuit of FIG. 13.

The reduction of power loss according to the switching power supply circuit of this embodiment is due to the elimination of the choke coil CH which is used in the circuit of FIG. 13 and thus results in a the absence of power loss of the choke coil CH in heavy load conditions. In addition, since the switching frequency rises to the maximum frequency during small-load operation, the filter choke coil $L_N$ does not have an increased power loss.

Figure 5:
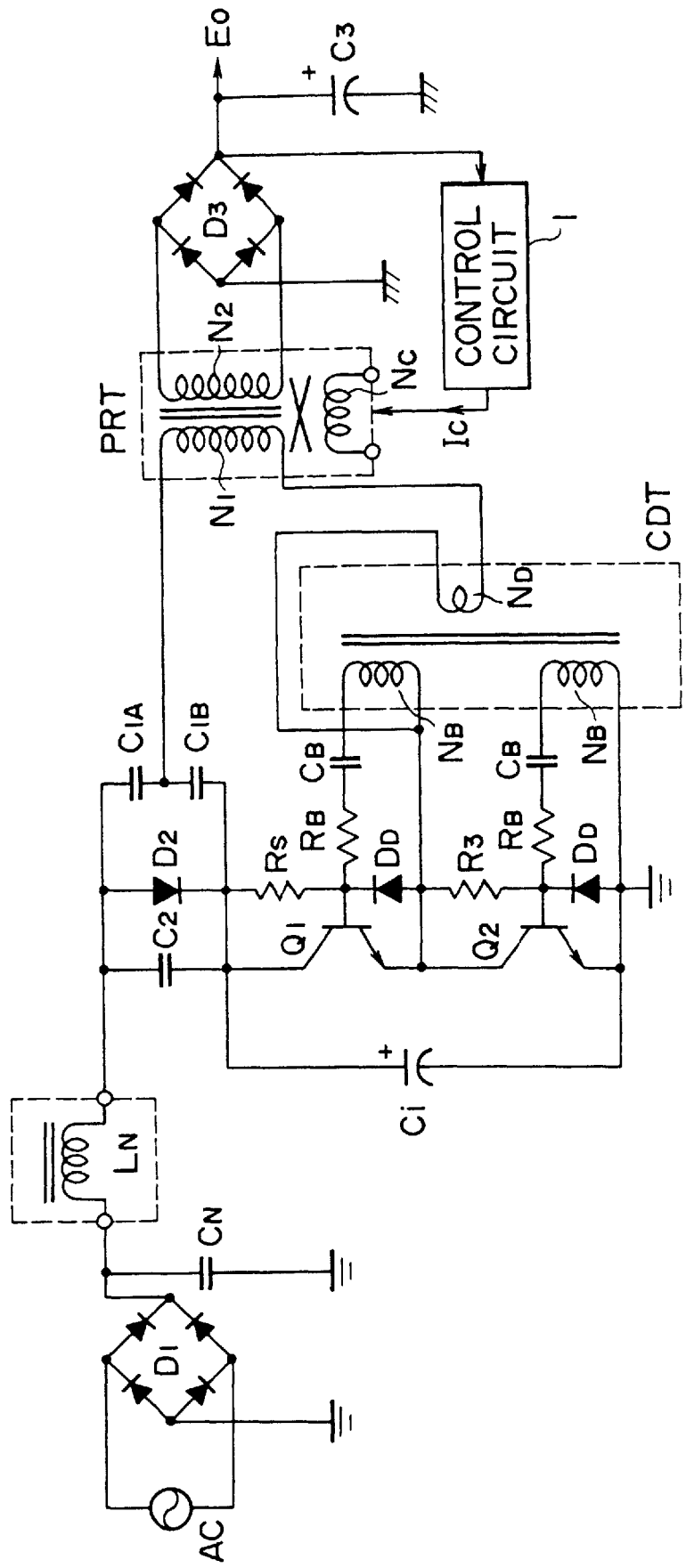
FIG. 5 is a schematic diagram of the current-resonance switching power supply circuit based on another embodiment of this invention.

FIG. 5 shows the switching power supply circuit based on another embodiment of this invention. In the figure, portions identical to those of FIG. 1 are referred to by the same symbols, and explanation thereof will be omitted. The circuit employs a converter driving transformer (CDT) which is a driving transformer without control winding $N_C$, and accordingly the switching frequency is fixed.

In exchange for this driving transformer, the insulating transformer is a power regulating transformer (PRT) of orthogonal type having a control winding $N_C$ wound orthogonally to the primary and secondary windings $N_1$ and $N_2$. The switching power supply circuit adopts the scheme of series resonant frequency control, in which the control circuit 1 controls the current to the control winding $N_C$ in order to to control the leakage flux of the insulating transformer PRT in response to the d.c. output voltage $E_o$, and varies the resonant current flowing in the series resonant circuit for implementing the constant voltage control.

The series resonant capacitor $C_1$ used in this embodiment is divided into two capacitors $C_{1A}$ and $C_{1B}$, with their total capacitance being equal to the capacitance of $C_1$. The capacitors $C_{1A}$ and $C_{1B}$ connected in series are connected in parallel to the fast-recovery diode as shown in the figure. The primary winding $N_1$ of the PRT is connected at one end to the node between the capacitors $C_{1A}$ and $C_{1B}$.

This circuit arrangement improves the power factor based on virtually the same operation as the circuit arrangement explained in connection with FIG. 1, and it also improves the power conversion efficiency due to the elimination of the choke coil CH.

Moreover, this embodiment is capable of setting an arbitrary power factor by changing the proportion of capacitances of the divided series resonant capacitors $C_{1A}$ and $C_{1B}$. For example, for certain fixed parameters of the filter choke coil $L_N$ and resonant capacitor $C_2$, it is possible to improve the power factor by selecting the capacitance of $C_{1A}$ to be greater than $C_{1B}$.

Figure 6:
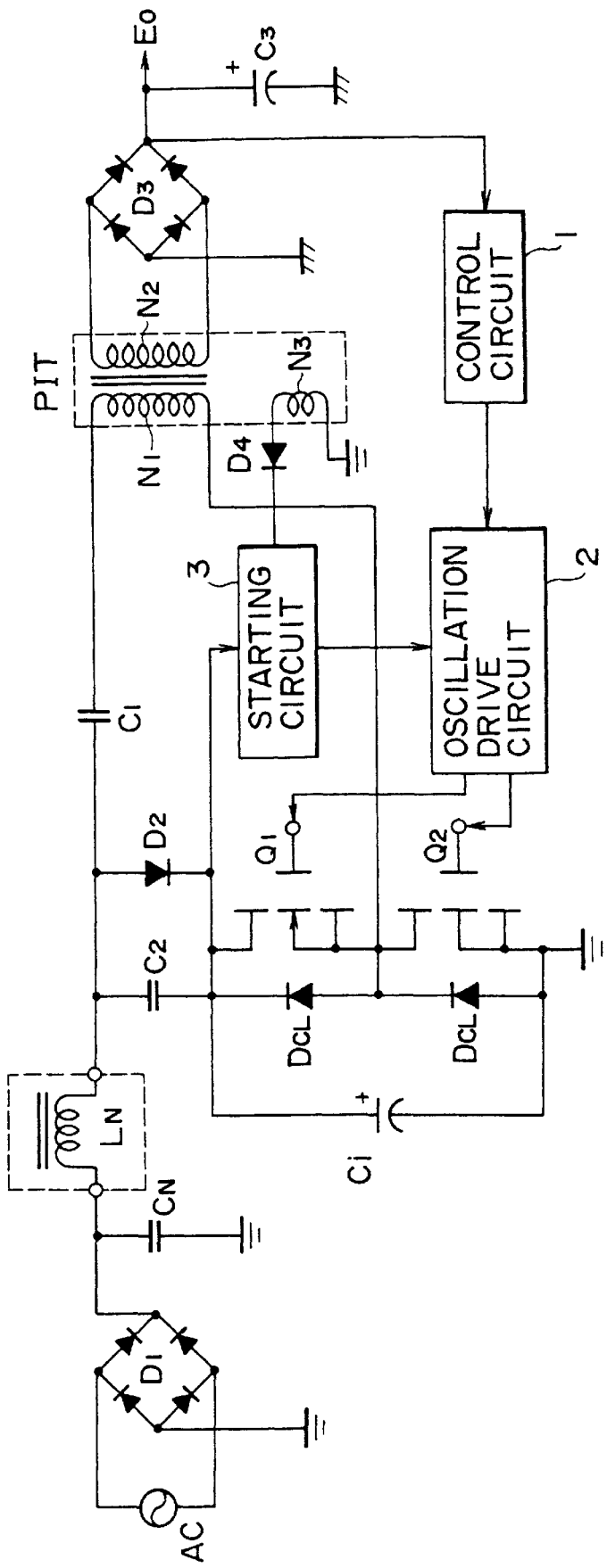
FIG. 6 is a schematic diagram of the current-resonance switching power supply circuit based on still another embodiment of this invention.

FIG. 6 shows the switching power supply circuit based on still another embodiment of this invention. In the figure, portions identical to those of FIG. 1 and FIG. 2 are referred to by the same symbols, and an explanation thereof will be omitted. The current-resonance power converter of the separate-excitation type based on this embodiment employs MOS-FETs for the switching elements $Q_1$ and $Q_2$ in half-bridge configuration.

The control circuit 1 controls the oscillation drive circuit 2 in response to the d.c. output voltage $E_o$ so that the switching drive voltages applied to the gates of the switching elements $Q_1$ and $Q_2$ by the drive circuit 2 are varied (based on the pulse-width modulation of the drive voltage, for example), thereby implementing the constant voltage control.

Diodes $D_D$ each connected between the drain and source of $Q_1$ and $Q_2$ in the direction as shown in the figure are damper diodes for circulating the current when the switching elements $Q_1$ and $Q_2$ turn off. A starting circuit 3 is used to start the oscillation drive circuit 2 by detecting the voltage or current on the rectify-smoothing line at the start-up of the power supply unit, and the starting circuit 3 is supplied with a low d.c. voltage produced by the tertiary winding $N_3$ of the insulating transformer PIT and a rectifying diode $D_4$.

For the circuit arrangement based on voltage-driven switching FETs as in this embodiment, in which case self-excited oscillation is difficult, it is desirable to use the oscillation drive circuit 2 and starting circuit 3 as shown.

This embodiment improves the power factor based on virtually the same circuit arrangement explained in connection with FIG. 1, and it also improves the power conversion efficiency.

Figure 7:
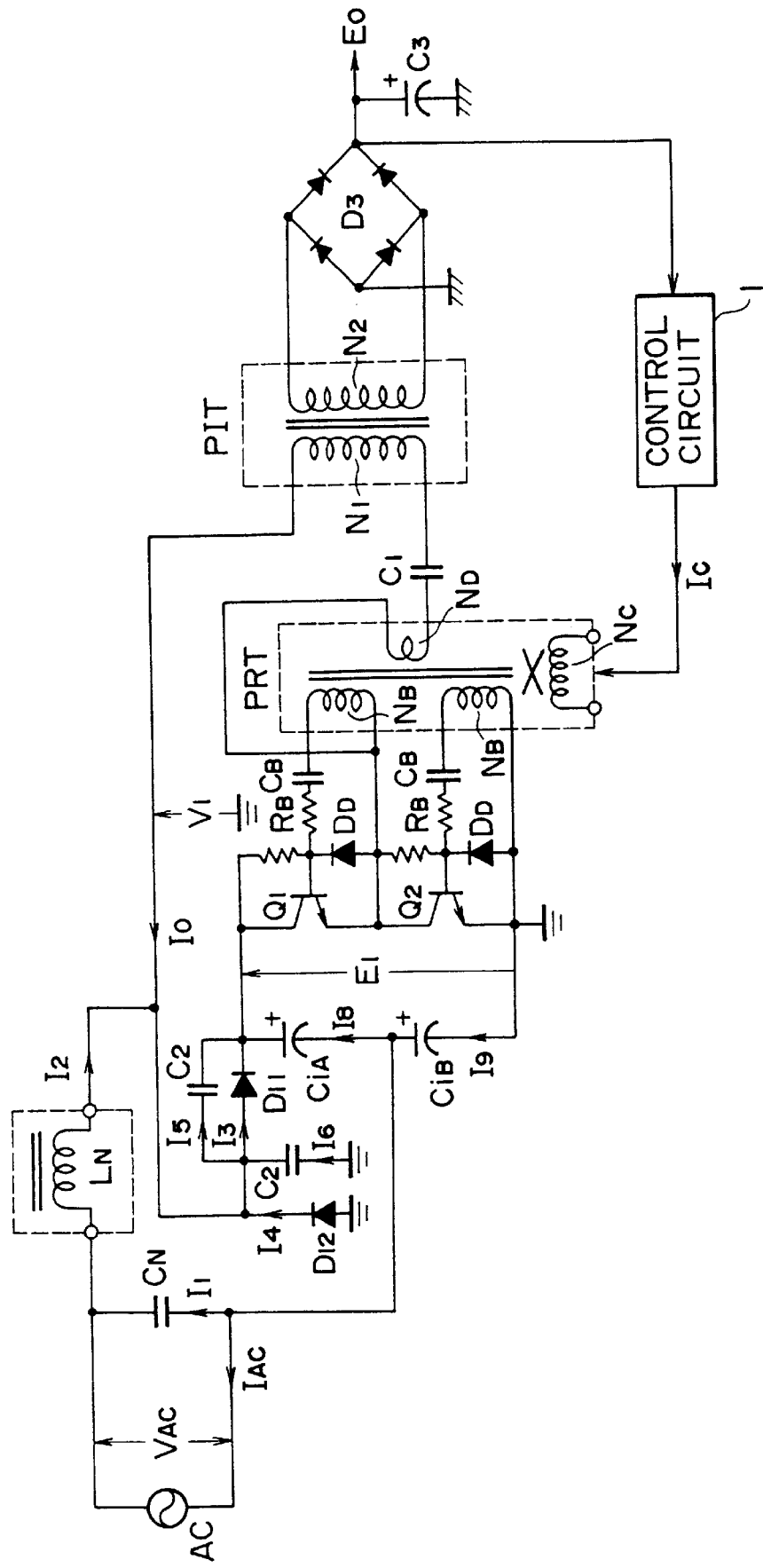
FIG. 7 is a schematic diagram of the current-resonance switching power supply circuit including a voltage-doubling rectifier based on still another embodiment of this invention.

FIG. 7 shows an embodiment of this invention which is applied to the switching power supply circuit having a voltage-doubling rectifier. The power supply circuit uses a self-excited current-resonance power converter of half-bridge configuration as used in the preceding embodiment shown in FIG. 1, and adopts the scheme of constant voltage control based on the switching frequency control by use of a PRT for the driving transformer. Portions identical to those of FIG. 1 are referred to by the same symbols, and an explanation thereof will be omitted.

The switching power supply circuit includes an LC low-pass filter (formed of $L_N$ and $C_N$) provided for the a.c. power supply AC. One terminal of the a.c. power supply AC is connected through the filter choke coil $L_N$ to the node of the anode of a rectifying diode $D_{11}$ and cathode of another rectifying diode $D_{12}$, and another terminal is connected to the node of smoothing capacitors $Ci_A$ and $Ci_B$. The smoothing capacitors $Ci_A$ and $Ci_B$ are connected in series between the rectify-smoothing line and the ground as shown. The rectifying diode $D_{11}$ has its cathode connected to the positive electrode of the smoothing capacitor $Ci_A$, and the rectifying diode $D_{12}$ has its anode connected to the ground.

In this circuit arrangement, the filter choke coil $L_N$ behaves as a load for the switching current of the switching power supply unit in half-bridge configuration, and the switching output is superimposed on the currents of the voltage-doubling rectifying diodes $D_{11}$ and $D_{12}$. On this account, the rectifying diodes $D_{11}$ and $D_{12}$ are of fast-recovery type. A capacitor $C_2$ is connected in parallel to each of the rectifying diodes $D_{11}$, and $D_{12}$, which provides a bypath for part of the switching output.

The voltage doubling operation of this switching power supply circuit is as follows. During the positive period of the a.c. input voltage $V_{AC}$, the smoothing capacitor $Ci_A$ is charged by the current flowing from the a.c. power supply AC to the filter choke coil $L_N$, to the rectifying diode $D_{11}$, to the smoothing capacitor $Ci_A$, and back to the a.c. power supply AC. During the negative period of the a.c. input voltage $V_{AC}$, the smoothing capacitor $Ci_B$ is charged by the current flowing from the a.c. power supply AC to the smoothing capacitor $Ci_B$, to the rectifying diode $D_{12}$, to the filter choke coil $L_N$, and back to the a.c. power supply AC. Consequently, a doubled rectified-and-smoothed voltage is produced as a sum of the voltages across the smoothing capacitors $Ci_A$ and $Ci_B$.

In this switching power supply circuit, the parallel capacitors $C_2$, filter choke coil $L_N$ and filter capacitor $C_N$ ($C_N$>$C_2$) have their resonant frequency set lower than the minimum switching frequency and virtually lower than the resonant frequency of the current resonant circuit of the switching power supply circuit, and the capacitors $C_2$ are selected to be smaller than the series resonant capacitor $C_1$. Based on this circuit arrangement, it becomes possible also for this embodiment to improve the power factor while eliminating the choke coil, whereby the compact and light-weight design of the switching power supply unit is fostered.

FIG. 8A through 8J show the current waveforms at various portions of the switching power supply circuit shown in FIG. 7. By the switching operation of this switching power supply circuit, the rectifying diodes $D_{11}$ and $D_{12}$ cycle the conducting and blocking states at the switching frequency.

The diodes $D_{11}$ and $D_{12}$ charge the smoothing capacitors $Ci_A$ and $Ci_B$ alternately during the positive and negative periods of the a.c. input voltage $V_{AC}$ shown in FIG. 8A. The charging currents $I_3$ and $I_4$ (shown in FIGS. 8D and 8E) have the superimposition of the switching output of high frequency (e.g., 100 kHz), resulting in an expanded conduction angle τ of the currents, and the average current $I_{AC}$ (shown in FIG. 8J) resembles the waveform the a.c. input voltage $V_{AC}$. Accordingly this voltage-doubling switching power supply unit improves the power factor. Currents $I_7$ and $I_8$ flowing through the smoothing capacitors $Ci_A$ and $Ci_B$ have the superimposition of the switching output as shown in FIGS. 8H and 8I.

Since one of the rectifying diodes is conductive during the period of conduction angle τ producing virtually the same operational waveform as the half-bridge switching power supply circuit based on the doubled rectified voltage, virtually no switching currents flow through the filter capacitor $C_N$ and resonant capacitor $C_2$ during this period.

During the nonconductive period of the rectifying diodes $D_{11}$ and $D_{12}$, switching currents flow through capacitors $C_2$ as shown by $I_5$ and $I_6$. Although during this nonconductive period small switching currents $I_1$ and $I_2$ (shown in FIGS. 8B and 8C) flow into the filter choke coil $L_N$ and filter capacitor $C_N$, these currents are not large enough to become noise components of the output power.

In the case of a prior art switching power supply circuit of current-resonance type, with the arrangement for the improvement of power factor shown in FIG. 13 being applied to the voltage-doubling rectifier, the filter capacitor $C_N$ is connected to the output of the filter choke coil $L_N$ which is connected directly to the a.c. power supply AC. According to this embodiment, in contrast to the above-mentioned prior art circuit arrangement, the filter choke coil $L_N$ is moved to the terminal side of the smoothing capacitor $Ci_A$ so that it also serves as a low-pass filter for preventing the feedback switching output from leaking to the a.c. power supply AC. The choke coil CH is eliminated and the power efficiency is improved also in this case.

According to this embodiment, the switching frequency is controlled to rise as the load to the switching power supply circuit decreases, allowing the feedback switching output to bypass the rectifying diodes $D_{11}$ and $D_{12}$. Consequently, the voltage rise on the smoothing capacitors is suppressed during the no-load operation and the voltage regulation can be improved. The power factor will further increase when a parallel resonant capacitor $C_2$ of much smaller capacitance is used, however; a filter choke coil of larger inductance is needed in this case.

Figure 9:
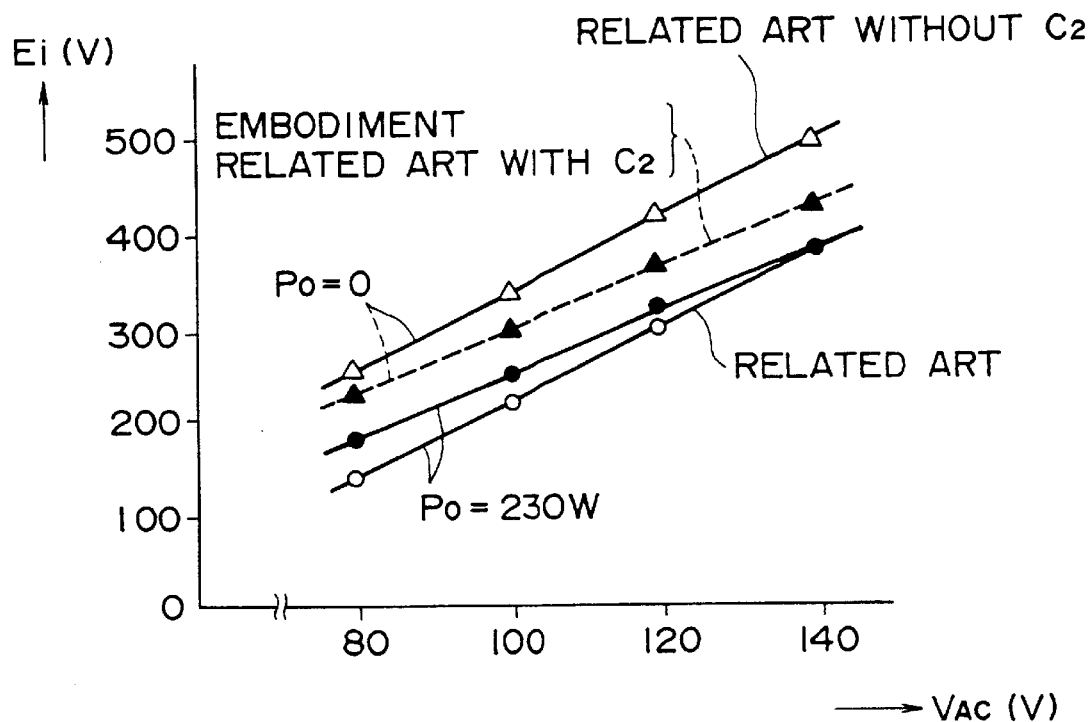
FIG. 9 is a graph showing the rectified-and-smoothed voltage vs. a.c. input voltage characteristics of the embodiment of FIG. 7.

FIG. 9 shows the rectified-and-smoothed voltage Ei vs. a.c. input voltage characteristics of the power supply circuit of this embodiment shown in FIG. 7 and the prior art power supply circuit with the arrangement for power factor improvement shown in FIG. 13 applied to the voltage-doubling rectifier in no-load condition (Po=0) and heavy load condition (Po=230). Plotted by mark ▲ is the characteristic of this embodiment and the prior art circuit with capacitor $C_2$, and plotted by mark Δ is the characteristic of the prior art circuit without $C_2$ in no-load condition. Plotted by mark ● is the characteristic of this embodiment, and plotted by mark ○ is the characteristic of the prior art circuit with $C_2$ in heavy load condition.

The graph reveals that the circuit of this embodiment achieves the smaller difference in the rectified-and-smoothed voltage Ei between heavy load and no-load conditions, and that this embodiment achieves the smaller variation of rectified-and-smoothed voltage Ei for the a.c. input voltage AC range 80–140 V than the prior art circuit with capacitor $C_2$ in both heavy load and no-load conditions.

Figure 10:
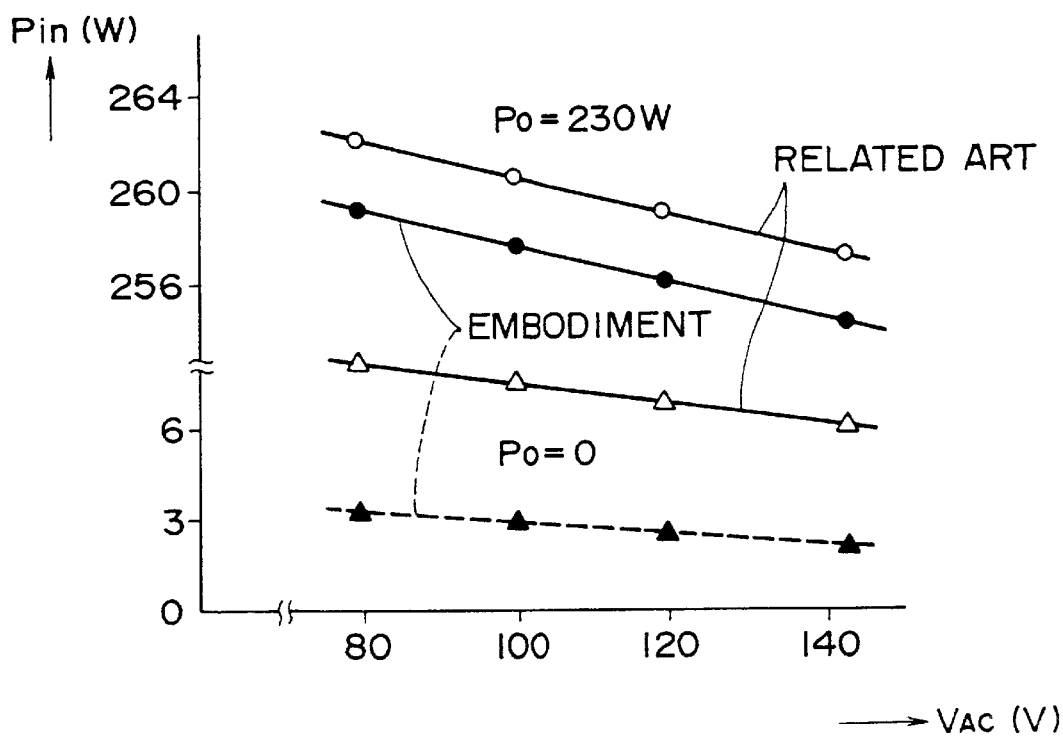
FIG. 10 is a graph showing the a.c. input power vs. a.c. input voltage characteristics of the embodiment of FIG. 7.

FIG. 10 shows the power efficiency, in which plotted by marks ● and ▲ are the characteristics of the circuit of this embodiment in heavy load and no-load conditions, respectively and plotted by marks ○ and Δ are the characteristics of the prior art circuit in heavy load and no-load conditions respectively. The graph reveals that the circuit of this embodiment is superior to the prior art circuit in its improved power efficiency in both the heavy load and no-load conditions.

Specifically, according to this embodiment, the power consumption in no-load condition decreases to 3.5 W from 7.5 W of the prior art circuit, and the power conversion efficiency rises to 89.5% from 88.5% of the prior art circuit. These improvements are due to the enhanced power efficiency which is attained by the elimination of the choke coil.

Figure 11:
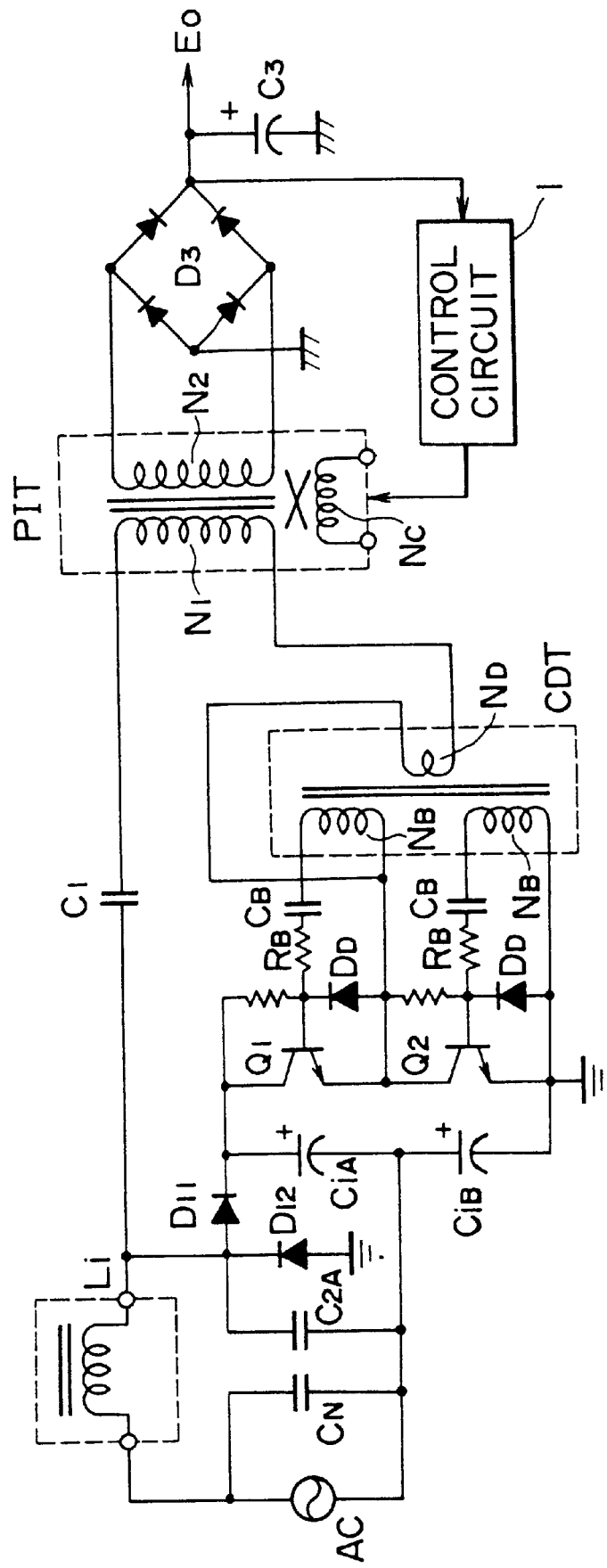
FIG. 11 is a schematic diagram of the current-resonance switching power supply circuit including a voltage-doubling rectifier based on still another embodiment of this invention.

FIG. 11 shows another embodiment of this invention applied to the switching power supply circuit having a voltage-doubling rectifier. This switching power supply circuit has a transformer (PRT) of orthogonal type for the insulating transformer. The control circuit 1 feeds a control current which corresponds to the d.c. output voltage $E_o$ to the control winding $N_C$ of the transformer PRT so as to vary the resonant frequency of the series resonant circuit (the is the method of of series resonant frequency control). In this embodiment, the switching frequency is maintained constant by means of a converter driving transformer (CDT). A single capacitor $C_{2A}$ having capacitance twice the capacitance of $C_2$ is connected in parallel to the diode $D_{12}$. The remaining portions of the circuit arrangement are identical to the embodiment of FIG. 7 and are referred to by common symbols.

Figure 12:
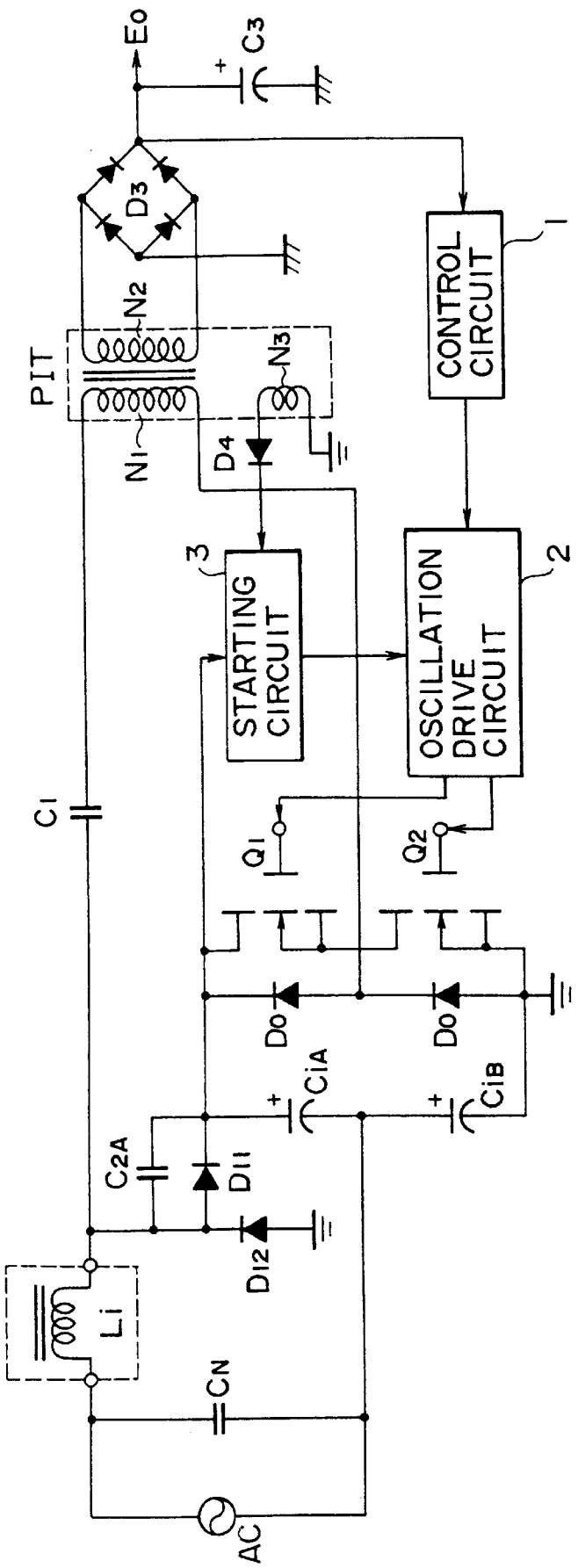
FIG. 12 is a schematic diagram of the current-resonance switching power supply circuit including a voltage-doubling rectifier based on still another embodiment of this invention.

FIG. 12 shows still another embodiment of the switching power supply circuit of current-resonance type having a voltage-doubling rectifier and using MOS-FETs for switching elements as in the preceding embodiment shown in FIG. 6.

The switching power supply circuits of FIG. 11 and FIG. 12 eliminate the choke coil CH, and the power conversion efficiency is improved and the compact and light-weight design of the switching power supply unit is fostered as in the embodiment shown in FIG. 7.

As described above, the switching power supply circuit of current-resonance type based on this invention includes a filter capacitor connected between the positive and negative rectifier output terminals, a filter choke coil and fast-recovery diode connected to cut in on the rectifier output line, and a resonant capacitor which forms a resonant circuit in unison with the filter choke coil, and operates to superimpose the output of the series resonant circuit located on the primary side on the rectifier output. Consequently, the choke coil used in the conventional circuit arrangement can be eliminated, and a more low-cost, compact, and light-weight design is accomplished. The elimination of the choke coil, which would be bulky in proportion to the load power, is particularly advantageous for switching power supply units that are intended for heavy load conditions.

The elimination of the choke coil also contributes to the improvement of power conversion efficiency particularly in heavy load condition due to the absence of power loss caused by the generation of eddy current in it, and contributes to the reduction of power consumption due to the drastic reduction of reactive power in the no-load standby state. Consequently, heat generation of the switching power supply unit can also be suppressed.

The inventive scheme of power factor improvement explained in the foregoing embodiments is not confined to the application to the switching power supply circuits of the combined types and schemes of these embodiments. Indeed, it is applicable extensively to current-resonance switching power supply circuits in various combinations of self-excited or separate-excited oscillation type, switching frequency control (with an orthogonal PRT as the driving transformer) or series resonant frequency control (with an orthogonal PRT as the insulating transformer) type, and half-bridge or full-bridge configuration of switching elements.

What is claimed is:

1. A switching power supply circuit of current-resonance type for improving a power factor, comprising:

rectifying means for rectifying a.c. line power and having positive and negative output terminals;

smoothing means for smoothing an output of said rectifying means and producing an output voltage;

switching means which operates by conducting and blocking the output voltage of said smoothing means and producing a switching output;

a series resonant circuit formed of a primary winding of an insulating transformer and a series resonant capacitor and being configured so that the switching output of said switching means is superimposed on the power on a connecting line between said rectifying means and said smoothing means;

a filter capacitor connected between the positive and negative output terminals of said rectifying means;

a filter choke coil and fast-recovery rectifying element connected in series in a connecting line between the positive output terminal of said rectifying means and a positive electrode of a smoothing capacitor of said smoothing means; and a resonant capacitor connected in parallel to said fast-recovery rectifying element to form a resonant circuit in combination with said filter choke coil, wherein the switching power supply circuit is void of a choke coil.

2. The switching power supply circuit of current-resonance type as set forth in claim 1, wherein said resonant circuit has a resonant frequency set to be lower than a minimum switching frequency.

3. The switching power supply circuit of current-resonance type as set forth in claims 1 or 2, wherein said series resonant capacitor is formed of first and second resonant capacitors connected in parallel to said fast-recovery rectifying element.

4. The switching power supply circuit of current-resonance type as set forth in claim 1, wherein said series resonant capacitor is formed of first and second capacitors connected in parallel to said fast-recovery rectifying element, and wherein said switching means has a switching frequency which is varied in response to a d.c. output voltage derived from an output of said insulating transformer, thereby implementing constant voltage control for the d.c. output voltage.

5. The switching power supply circuit of current-resonance type as set forth in claim 2, wherein said series resonant capacitor is formed of first and second capacitors connected in parallel to said fast-recovery rectifying element, and wherein said switching means has a switching frequency which is varied in response to a d.c. output voltage derived from an output of said insulating transformer, thereby implementing constant voltage control for the d.c. output voltage.

6. The switching power supply circuit of current-resonance type as set forth in claim 1, wherein said series resonant capacitor is formed of first and second capacitors connected in parallel to said fast-recovery rectifying element, and wherein said insulating transformer has a magnetic flux which is varied in response to a d.c. output voltage derived from an output of said insulating transformer, thereby implementing constant voltage control for the d.c. output voltage.

7. The switching power supply circuit of current-resonance type as set forth in claim 2, wherein said series resonant capacitor is formed of first and second capacitors connected in parallel to said fast-recovery rectifying element, and wherein said insulating transformer has a magnetic flux which is varied in response to a d.c. output voltage derived from an output of said insulating transformer, thereby implementing constant voltage control for the d.c. output voltage.

8. The switching power supply circuit of current-resonance type as set forth in claim 1, wherein said series resonant capacitor is formed of first and second capacitors connected in parallel to said fast-recovery rectifying element, and wherein said switching means comprises a separate-excited converter of current-resonance type, said converter having a switching drive signal which is varied in response to a d.c. output voltage derived from an output of said insulating transformer, thereby implementing constant voltage control for the d.c. output voltage.

9. The switching power supply circuit of current-resonance type as set forth in claim 2, wherein said series resonant capacitor is formed of first and second capacitors connected in parallel to said fast-recovery rectifying element, and wherein said switching means comprises a separate-excited converter of current-resonance type, said converter having a switching drive signal which is varied in response to a d.c. output voltage derived from an output of said insulating transformer, thereby implementing constant voltage control for the d.c. output voltage.

10. A switching power supply circuit of current-resonance type, comprising:

voltage-doubling rectifying means for implementing voltage-doubling rectification of a.c. line power and producing an output;

smoothing means for smoothing the output of said voltage-doubling rectifying means and producing an output voltage;

switching means which operates by conducting and blocking the output voltage of said smoothing means; and an insulating transformer supplied on a primary winding thereof with a switching current provided by said switching means by way of a series resonant capacitor, with d.c. output power being derived from an output at a secondary winding of said insulating transformer, wherein said switching power supply circuit further includes, on an input side of said voltage-doubling rectifying means where said a.c. line power is supplied, a filter capacitor for blocking switching noise and a filter choke coil connected in series in a rectification path from said voltage-doubling rectification means to said switching means, with a switching current produced by said switching means being fed to rectifying elements which constitute said voltage-doubling rectifying means by way of the primary winding of said insulating transformer, and wherein said switching power supply circuit is void of a choke coil.

11. The switching power supply circuit of current-resonance type as set forth in claim 10, wherein said rectifying elements constituting said voltage-doubling rectifying means are of a fast-recovery type.

12. The switching power supply circuit of current-resonance type as set forth in claims 10 or 11, wherein parallel resonant capacitors are connected in parallel to the rectifying elements of said voltage-doubling rectifying means such that resonant circuits formed of said filter choke coil and said parallel resonant capacitors have a resonant frequency lower than a minimum switching frequency.

13. The switching power supply circuit of current-resonance type as set forth in any of claims 1, 2, 10, or 11, wherein said switching means has a switching frequency which is varied in response to a d.c. output voltage derived from an output of said insulating transformer, thereby implementing constant voltage control for the d.c. output voltage.

14. The switching power supply circuit of current-resonance type as set forth in any of claims 1, 2, 10, or 11, wherein said insulating transformer has a magnetic flux which is varied in response to a d.c. output voltage derived from an output of said insulating transformer, thereby implementing constant voltage control for the d.c. output voltage.

15. The switching power supply circuit of current-resonance type as set forth in any of claims 1, 2, 10, or 11, wherein said switching means comprises a separate-excited converter of current-resonance type, said converter having a switching drive signal which is varied in response to a d.c. output voltage derived from an output of said insulating transformer, thereby implementing constant voltage control for the d.c. output voltage.

16. The switching power supply circuit of current-resonance type as set forth in claim 10, further comprising parallel resonant capacitors connected in parallel to the rectifying elements of said voltage-doubling rectifying means such that resonant circuits formed of said filter choke coil and said parallel resonant capacitors have a resonant frequency lower than a minimum switching frequency, and wherein said switching means has a switching frequency which is varied in response to a d.c. output voltage derived from an output of said insulating transformer, thereby implementing constant voltage control for the d.c. output voltage.

17. The switching power supply circuit of current-resonance type as set forth in claim 11, further comprising parallel resonant capacitors connected in parallel to the rectifying elements of said voltage-doubling rectifying means such that resonant circuits formed of said filter choke coil and said parallel resonant capacitors have a resonant frequency lower than a minimum switching frequency, and wherein said switching means has a switching frequency which is varied in response to a d.c. output voltage derived from an output of said insulating transformer, thereby implementing constant voltage control for the d.c. output voltage.

18. The switching power supply circuit of current-resonance type as set forth in claim 10, further comprising parallel resonant capacitors connected in parallel to the rectifying elements of said voltage-doubling rectifying means such that resonant circuits formed of said filter choke coil and said parallel resonant capacitors have a resonant frequency lower than a minimum switching frequency, and wherein said insulating transformer has a magnetic flux which is varied in response to a d.c. output voltage derived from an output of said insulating transformer, thereby implementing constant voltage control for the d.c. output voltage.

19. The switching power supply circuit of current-resonance type as set forth in claim 11, further comprising parallel resonant capacitors connected in parallel to the rectifying elements of said voltage-doubling rectifying means such that resonant circuits formed of said filter choke coil and said parallel resonant capacitors have a resonant frequency lower than a minimum switching frequency, and wherein said insulating transformer has a magnetic flux which is varied in response to a d.c. output voltage derived from an output of said insulating transformer, thereby implementing constant voltage control for the d.c. output voltage.

20. The switching power supply circuit of current-resonance type as set forth in claim 10, further comprising parallel resonant capacitors connected in parallel to the rectifying elements of said voltage-doubling rectifying means such that resonant circuits formed of said filter choke coil and said parallel resonant capacitors have a resonant frequency lower than a minimum switching frequency, and wherein said switching means comprises a separate-excited converter of current-resonance type, said converter having a switching drive signal which is varied in response to a d.c. output voltage derived from an output of said insulating transformer, thereby implementing constant voltage control for the d.c. output voltage.

21. The switching power supply circuit of current-resonance type as set forth in claim 11, further comprising parallel resonant capacitors connected in parallel to the rectifying elements of said voltage-doubling rectifying means such that resonant circuits formed of said filter choke coil and said parallel resonant capacitors have a resonant frequency lower than a minimum switching frequency, and wherein said switching means comprises a separate-excited converter of current-resonance type, said converter having a switching drive signal which is varied in response to a d.c. output voltage derived from an output of said insulating transformer, thereby implementing constant voltage control for the d.c. output voltage.

\* \* \* \* \*